June 26, 1962 A. EISELE 3,040,436
SHAFT-AND-MOUNT CONCENTRICITY GAUGE
Filed Aug. 20, 1959 2 Sheets-Sheet 1

INVENTOR.
ANDREW EISELE
BY
Barthel & Bugbee
ATTORNEYS

June 26, 1962  A. EISELE  3,040,436
SHAFT-AND MOUNT CONCENTRICITY GAUGE
Filed Aug. 20, 1959  2 Sheets-Sheet 2
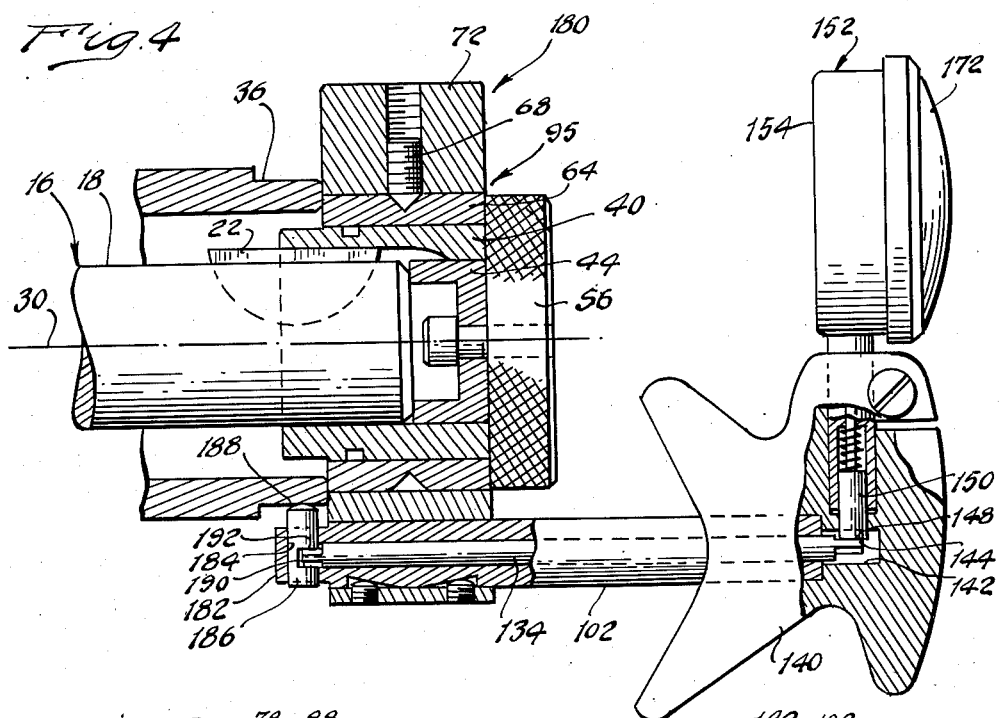
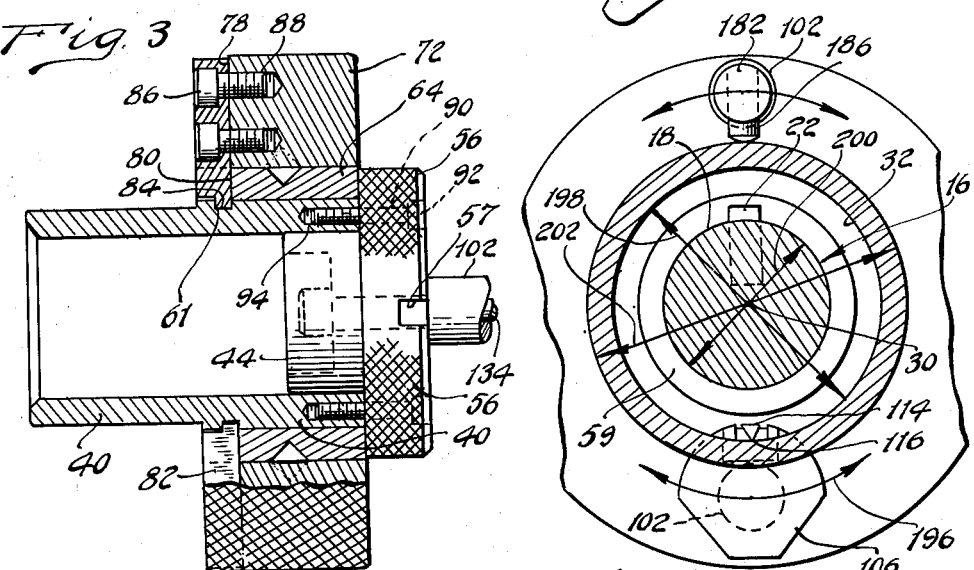
INVENTOR.
ANDREW EISELE
BY
Barthel & Bugbee
ATTORNEYS.

United States Patent Office 3,040,436
Patented June 26, 1962

3,040,436
SHAFT-AND-MOUNT CONCENTRICITY GAUGE
Andrew Eisele, 15025 Cheyenne Ave., Detroit 27, Mich.
Filed Aug. 20, 1959, Ser. No. 835,005
11 Claims. (Cl. 33—174)

This invention relates to gauges and, in particular, to concentricity gauges.

One object of this invention is to provide a concentricity gauge which will quickly and accurately show the concentricity or deviation from concentricity of a shaft and an intended concentric surface on a mount adjacent said shaft, including the situation where the shaft is spaced radially away from the mount bore through which it passes, leaving an annular space therebetween.

Another object is to provide a shaft-and-mount concentricity gauge of the foregoing character wherein the gauge is adapted to be applied to the end of the shaft projecting from the mount and rotated with the shaft so that a feeler element traces out the contour of the intendedly concentric surface relatively to the shaft and indicates any deviation thereof from concentricity.

Another object is to provide a shaft-and-mount concentricity gauge of the foregoing character wherein the gauge by a change in some of its parts, is adapted to measure the concentricity or deviation from concentricity of the shaft and the intendedly concentric external or internal surface of the mount, thereby adapting the major part of the gauge to be used for both the internal and external surface concentricity determination relatively to the shaft.

Other objects and advantages of the invention will become apparent during the course of the following description of the accompanying drawings, wherein:

FIGURE 3 is a horizontal section taken along the line 3—3 in FIGURE 2;

Figure 1:
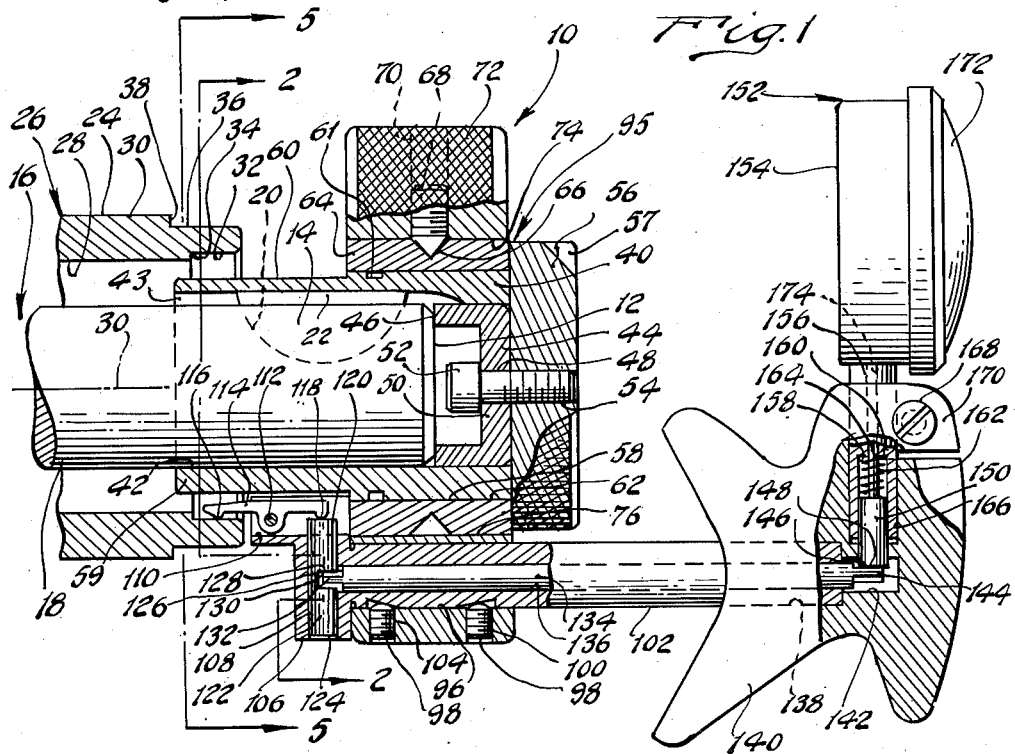
FIGURE 1 is a central longitudinal vertical section through a shaft and a mount having a bore therethrough, with a shaft-and-mount concentricity gauge applied thereto for measuring the concentricity of the mount bore relatively to the shaft passing therethrough, according to one form of the invention, with the dial indicator holder and dial indicator shown partly in side elevation.

FIGURE 4 is a central vertical longitudinal section, similar to FIGURE 1, but showing the gauge thereof modified for measuring the concentricity of the external annular surface of the mount relatively to the shaft passing therethrough; and FIGURE 5 is a diagrammatic composite fragmentary vertical cross-section taken along the line 5—5 in FIGURE 1, or along a similar line in FIGURE 4, illustrating the operation of the gauge for measuring external and internal annular surface concentricity relatively to a shaft shown in cross-section therein.

Hitherto, it has been difficult to measure with accuracy the concentricity of the end portion of a shaft and the bore in a mount, such as an oil seal mount, through which the shaft passes in radially-spaced relationship, in order to determine its suitability for receiving the oil seal, and instruments for quickly, accurately and easily performing this measurement have hitherto been lacking.

The present invention provides a shaft-and-mount concentricity gauge which enables the rapid and precise measurement of the concentricity both of the oil seal bore and of an external annular surface of the oil seal mount intended to be coaxial with both the shaft and the oil seal mount bore spaced radially away from the shaft. The shaft-and-mount concentricity gauge of the present invention is adapted, by the interchanging of certain parts, for the concentricity measurement either of the oil seal mount bore or of the external annular surface thereof relatively to the shaft, thereby simplifying and reducing the cost of manufacture of the instrument as well as enabling its repair and maintenance to be more effectively carried out with a minimum of parts required to be carried in stock for that purpose.

Figure 2:
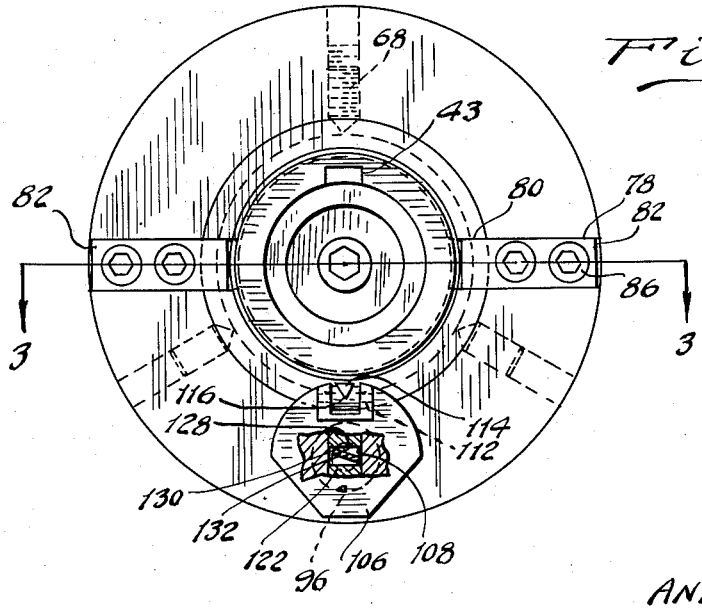
FIGURE 2 is a vertical cross-section taken along the line 2—2 in FIGURE 1, but with the gauge removed from the shaft and the mount.

Referring to the drawings in detail, FIGURES 1, 2 and 3 show a shaft-and-mount internal concentricity gauge, generally designated 10, according to one form of the invention as shown applied against the end 12 of the end portion 14 of a shaft 16 having an external cylindrical surface 18 with an arcuate recess or key seat 20 therein for the reception of a conventional Woodruff key 22. The shaft 16 extends through the axially-projecting portion 24 of an oil seal mount, generally designated 26, such as the flanged crankcase end cover bolted to an internal combustion engine crankcase (not shown) wherein the shaft 16 is the crankshaft. The end portion 24 contains a bore 28 intendedly coaxial with the axis 30 of the shaft 16 but spaced radially away from the cylindrical external surface 18 of the shaft 16 and at its outer end containing an internal cylindrical encircling surface or counterbore 32 adapted to receive a conventional oil seal (not shown) seated against the annular shoulder 34 therebetween for preventing leakage of oil from the crankcase around the shaft 16. The oil seal mount end portion 24 is sometimes encircled by an external cylindrical encircling surface 36 which is also intended to be concentric or coaxial with the axis 30 of the shaft 16 and also concentric or coaxial with the internal cylindrical encircling surface or counterbore 32, and has an annular shoulder 38 between it and the external surface 30 of the end portion 24 of the oil seal mount 26.

The shaft-and-mount concentricity gauge 10 (FIGURE 1) includes a locating sleeve 40 having a locating bore 42 therein with an axial keyway 43 adapted to snugly engage the external surface 18 and key 22 of the shaft 16 so as to render the sleeve bore 42 accurately coaxial with the axis 30 of the shaft 16. The outer end of the bore 42 contains a stop cup 44 having an annular end stop surface 46 adapted to engage the end 12 of the shaft 16. The stop cup 44 is provided with a central hole 48 and a recess 50 therearound for receiving the shank and head respectively of a screw 52 threaded into a threaded bore 54 in a knurled disc 56.

The locating sleeve 40 is provided with a precisely-machined external cylindrical surface 58 and with an axially-projecting extension 59 having a slightly smaller diameter cylindrical surface 60 near its inner end. The outer cylindrical surface 58 contains an annular groove 61. The outer cylindrical surface 58 is snugly engaged by the internal cylindrical surface or bore 62 of an adapter ring 64 engaged at its outer end by the disc 56 and provided with circumferentially-spaced conical seats or recesses 66 for the correspondingly conical inner ends of headless set screws 68 threaded through correspondingly circumferentially-spaced radial holes 70 in an externally-knurled handle ring 72 having a bore 74 precisely machined for snug engagement with the precisely-machined external surface 76 of the adapter ring 64. Then handle ring 72 and adapter 64 are diametrically grooved as at 78 and 80 respectively (FIGURES 2 and 3) to receive radially-disposed dogs 82 having arcuately-ridged inner ends 84 adapted to snugly engage the annular groove 59. The dogs 82 are drilled and countersunk to receive set screws 86 which are threaded into holes 88 in the mounting ring 72. The disc 56 is likewise drilled and countersunk at 90 (FIGURE 3) to receive set screws 92 threaded into holes 94 in the outer end portion of the locating sleeve 40 for securing the former to the latter. The handle ring 72, adapter ring 64, locating sleeve 40 and disc 56 collectingly form a carrying structure, generally designated 95.

The handle ring 72 (FIGURE 1) is provided with a gauge-carrying bore 96 disposed parallel to the axis of the bores 74, 62 and 42 but in radially-spaced relationship therewith. Mounted in the bore 96 and held in place by set screws 98 in radial holes 100 in the handle ring 72 is a tubular support or hollow gauge stem 102 having oppositely-inclined seats 104 engaged in oppositely-inclined seats 104 engaged in oppositely-wedging relationship by the rounded ends of the set screws 98 so as to hold the stem 102 firmly in position within its bore 96 and to hold the enlarged head 106 of the stem 102 against the inner side of the handle ring 72. The enlarged head 106 contains a radial or transverse bore 108 communicating at its inner end with an axial recess 110, the side walls of which are drilled in alignment to receive a pivot pin 112. Upon the pin 112 is pivotally mounted the central portion of an encircling surface feeler or measuring lever 114 intermediate its laterally-projecting forward and rearward rounded contact ends 116 and 118 respectively. The forward projection 116 of the feeler 114 is of V-shaped cross-section (FIGURE 2) and is adapted to tracingly engage the counterbore 32 to be gauged for concentricity with the axis 30 of the shaft 16, whereas the rearward projection 118 thereof engages the inner end surface 120 of a transverse motion-transmitting pin 122 mounted snugly but reciprocably within the transverse bore 108.

The transverse motion-transmitting pin 122 intermediate its opposite ends 120 and 124 is provided with a notch 126, one flat radial side face 128 of which is engaged by the sharp contact or corner edge 130 of a diametral flat end portion 132 upon the inner end of a longitudinal motion-transmitting rod 134. The latter is rotatably mounted in a bore 136 within the gauge stem 102 for rocking motion relatively thereto. The stem 102 is mounted in a bore 138 within a dial indicator holder 140. The outer end of the longitudinal motion-transmitting rod 134 opens into a counterbore 142 in the end of the bore 138 and there possesses a diametral flat portion 144 similar to the diametrical flat portion 132 and similarly having a sharp edge 146.

The sharp edge 146 engages the flat outer end 148 of the operating plunger 150 (FIGURE 1) of a conventional dial indicator, generally designated 152. The dial indicator 152 has a casing 154 carrying a hollow stem 156 provided at its lower end with a counterbore 158 opening into a bore 160. The operating plunger 150 is reciprocably mounted in the counterbore 158 and has a reduced diameter portion 162 encircled by a compression spring 164 within the counterbore 158 and urging the plunger 150 constantly into contact with the sharp contact edge 146. The stem 156 is locked within a bore 166 in the dial indicator holder 140 by means of a clamping screw 168 engaging a split clamping portion 170. A dial (not shown) behind a crystal 172 contains a graduated scale which registers with a needle (not shown) connected by motion-multiplying mechanism connected to the reduced diameter plunger portion 162, which slidably engages a reduced diameter bore 174 in the stem 156.

The modified shaft-and-mount external concentricity gauge, generally designated 180, shown in FIGURE 4 is similar in most respects to the gauge 10 of FIGURES 1, 2 and 3 and differs only in such structural characteristics which enable it to measure the concentricity of the annular external surface 36 relatively to the axis 30 of the shaft 16, rather than that of the counterbore 32 thereof as in the case of the gauge 10 of FIGURES 1, 2 and 3. For this purpose, the stem 102 has a reduced diameter inner end portion 182 containing a transverse bore 184 in which is reciprocably mounted a transversely-movable measuring pin or feeler pin 186 having a rounded contact end 188 adapted to engage the annular surface 136 and indicate the concentricity thereof relatively to the axis 30 of the shaft 16. The measuring pin 186 has an intermediate notch 190 with a flat radial side face 192 engaged by the sharp contact or corner edge 130 of the diametral inner flat portion 132 upon the motion-transmitting rod 134 previously mentioned. The remainder of the construction of the gauge 180 is similar to that of the internal concentricity gauge 10 previously described with the exception of the fact that the locating sleeve 40 is somewhat shorter than in FIGURE 1. Accordingly, similar parts bear the same reference numerals.

In the operation of the shaft-and-mount internal concentricity gauge 10 of FIGURES 1, 2 and 3, let it be assumed that the locating sleeve 40 has been slipped over the end portion of the shaft 16 with the end surface 46 of its stop cup 44 engaging the end surface 12 of the shaft 16, and with the keyway 43 aligned with and receiving the Woodruff key 22. Under these circumstances, the feeler projection 116 of the feeler lever 114 engages the counterbore 32, the concentricity of which is to be measured relatively to the shaft 16. The operator then grasps the handle ring 72 in one hand and rotates the entire assembly of the above-mentioned parts which make up the gauge 10. As rotation occurs, and with it the shaft 16, the contact projection 116 of the feeler lever 114 traces out an annular path engaging the counterbore 32.

If the cylindrical surface 32 is accurately concentric with the shaft axis 30, the contact projection 116 of the feeler lever 114 will remain motionless during rotation, moving neither inward nor outward relatively to its pivot pin 112. If, on the other hand, eccentricity exists, or recesses or flats or other irregularities in the surface of the counterbore 32 are present, the contact projection 116 traces out the contour thereof, rocking on its pivot pin 112 while so doing. The consequent inward and outward motion of the inner contact projection 118 causes radial motion of the motion-transmitting pin 122 within the radial bore 108, thereby rotating the motion-transmitting rod 134 a partial revolution around its longitudinal axis by the engagement of the sharp corner edge 130 of the flat end portion 132 with the flat side 128 of the notch 126. This rotary motion of the motion-transmitting rod 134 is converted into reciprocating motion of the dial indicator plunger 150 by the engagement of the sharp corner edge 146 with the flat end portion 148 of the plunger 150. This in turn is transmitted by the motion-converting mechanism (not shown) within the dial indicator 152 to the needle thereof. The swing of this needle (not shown) over its graduated scale (not shown) indicates the deviation of the surface of the counterbore 32 from concentricity with the axis 30 of the shaft 16. The motion thus produced is shown diagrammatically in FIGURE 5, wherein the lower arcuate double-headed arrow 196 indicates the rocking or rotation of the instrument for measuring the concentricity of the counterbore 32 relatively to the axis of the shaft 16 as indicated by the arrows 198 and 200 representing the diameters of the counterbore 32 and shaft external surface 18 respectively.

In the operation of the modified gauge 10, the rounded end 188 of the feeler pin or measuring pin 186 engages the external annular surface 36 after the gauge 180 has been applied to the end of the shaft 16 in the manner previously described. As the gauge 180 is rotated together with the shaft 16, the contact end 188 of the feeler pin 186 remains stationary if true concentricity exists, but moves inward or outward if a deviation from concentricity exists. This outward or inward motion is conveyed in the same manner described above to the motion-transmitting rod 134 and thence through the dial indicator plunger 150 to the needle of the dial indicator 152, the latter by its swing relatively to its graduated scale (not shown) indicating the extent of deviation from concentricity. This in effect measures the difference in concentricity between the shaft diameter indicated by the arrow 200 and the external diameter of the external annular surface 36 indicated by the double-headed arrow 202 in FIGURE 5.

Thus, the internal and external concentricity gauges 10 annd 180 of the invention provide rapid and precise indications of concentricity of internal and external annular or cylindrical surfaces relatively to the external cylindrical surface of a shaft and consequently relatively to the axis of the shaft to which the gauge is applied. By substituting an axially thicker or thinner stop cup 44 for the one previously in use, the distance of the circular path of contact of the feeler projection 116 (FIGURE 1) or end 188 (FIGURE 4) on the internal and external surfaces 32 or 36 respectively from the shaft end 12 can be varied as desired, according to the particular work being gauged. Also, the peripheral hole 96 in the handle ring 72 may be bored at different radial distances from the shaft axis 30 to adapt the gauge to the concentricity measurement of bores 32 or external surfaces 36 of different diameters.

What I claim is:

1. A shaft-and-mount concentricity gauge for measuring the concentricity of an encircling surface of an apertured mount relatively to the end portion of a shaft intendedly concentric therewith by means of a dial indicator, said gauge comprising a carrying structure having a locating bore adapted to fit snugly over the end portion of the shaft and having a carrying bore spaced apart from said locating bore in eccentric relationship therewith, a tubular support mounted in said carrying bore with its forward end portion projecting therethrough, said tubular support having a longitudinal bore extending therethrough, said forward end portion of said support having a transverse bore communicating with said longitudinal bore, a dial indicator holder mounted on said support remote from the forward end portion thereof, an encircling surface feeler device mounted on said forward end portion of said support and including a transverse motion-transmitting member reciprocably mounted in said transverse bore, and a longitudinal motion-transmitting member movably mounted in said longitudinal bore in operative engagement with said transverse motion-transmitting member, said longitudinal motion-transmitting member being movable in response to transverse motion of said feeler device resulting from a deviation from concentricity of said encircling surface relatively to said shaft during relative rotation therebetween and operatively engageable with a dial indicator mounted on said dial indicator holder.

2. A shaft-and-mount concentricity gauge, according to claim 1, wherein said carrying structure includes a locating sleeve engageable with the end portion of the shaft, said sleeve containing said locating bore.

3. A shaft-and-mount concentricity gauge, according to claim 2, wherein a stop element is removably mounted in said locating bore in said sleeve and engageable with the end of the shaft.

4. A shaft-and-mount concentricity gauge, according to claim 2, wherein an apertured handle member is disposed outwardly of said sleeve and connected thereto, said handle member containing said carrying bore.

5. A shaft-and-mount concentricity gauge, according to claim 1, wherein a stop element is disposed in said locating bore and engageable with the end of the shaft.

6. A shaft-and-mount concentricity gauge, according to claim 1, wherein means is provided on said carrying structure for locking said carrying structure to the shaft against relative rotation therebetween.

7. A shaft-and-mount concentricity gauge, according to claim 1, wherein said feeler device also includes a feeler element movably mounted on said carrying structure in operative engagement with said transverse motion-transmitting member and adapted to tracingly engage the encircling surface during relative rotation between the shaft and the encircling surface.

8. A shaft-and-mount concentricity gauge, according to claim 7, wherein said feeler element comprises a feeler lever pivotally mounted on said support.

9. A shaft-and-mount concentricity gauge, according to claim 8, wherein said feeler lever is disposed longitudinally of said support with its forward end adapted to engage the encircling surface and with its rearward end engaging said transverse motion-transmitting member.

10. A shaft-and-mount concentricity gauge, according to claim 1, wherein said feeler device also includes an encircling-surface-contacting portion on said transverse motion-transmitting member.

11. A shaft-and-mount concentricity gauge, according to claim 10, wherein said encircling-surface-contacting portion is disposed on the inner end of said transverse motion-transmitting member.

References Cited in the file of this patent

UNITED STATES PATENTS

| | | |
|---|---|---|
| 2,030,237 | Brittain et al. | Feb. 11, 1936 |
| 2,146,508 | McClure | Feb. 7, 1939 |
| 2,700,224 | Johnson | Jan. 25, 1955 |
| 2,938,272 | Conklin | May 31, 1960 |

FOREIGN PATENTS

| | | |
|---|---|---|
| 619,331 | Great Britain | Mar. 8, 1949 |